US007213681B2

(12) United States Patent
Birchak et al.

(10) Patent No.: US 7,213,681 B2
(45) Date of Patent: May 8, 2007

(54) ACOUSTIC STIMULATION TOOL WITH AXIAL DRIVER ACTUATING MOMENT ARMS ON TINES

(75) Inventors: James R. Birchak, Spring, TX (US); Thomas E. Ritter, Katy, TX (US); Ali I. Mese, Houston, TX (US); Diederik van Batenburg, Delft (NL); William Trainor, Houston, TX (US); Wei Han, Missouri City, TX (US); Kwang Yoo, Houston, TX (US); Daniel P. Kusmer, Sugar Land, TX (US); Mark A. Proett, Missouri City, TX (US); Ferdinand van der Bas, Vlaardingen (NL); Peter van der Sman, Heemstede (NL); Jeroen Groenenboom, The Hague (NL); Pedro Zuiderwijk, Delft (NL)

(73) Assignees: Halliburton Energy Services, Inc., Duncan, OK (US); Shell International Exploration and Production B.V., Rijawijk (NL)

( * ) Notice: Subject to any disclaimer, the term of this patent is extended or adjusted under 35 U.S.C. 154(b) by 220 days.

(21) Appl. No.: 11/059,214

(22) Filed: Feb. 16, 2005

(65) Prior Publication Data

US 2006/0180386 A1    Aug. 17, 2006

(51) Int. Cl.
  *G01V 1/02*     (2006.01)
  *G01V 1/112*    (2006.01)
  *G01V 1/143*    (2006.01)

(52) U.S. Cl. ............... 181/121; 181/101; 181/106; 181/113; 367/157

(58) Field of Classification Search ............... 181/121, 181/105, 106, 111, 113; 367/35, 157, 160, 367/165, 189
See application file for complete search history.

(56) References Cited

U.S. PATENT DOCUMENTS

| | | | |
|---|---|---|---|
| 4,393,932 A | 7/1983 | Bodine | 166/249 |
| 4,665,980 A | 5/1987 | Bodine | 166/249 |
| 4,673,652 A * | 6/1987 | McStravick et al. | 436/2 |
| 5,273,114 A | 12/1993 | Wicks, III et al. | 166/278 |
| 5,676,213 A | 10/1997 | Auzerais et al. | 175/58 |
| 5,825,720 A * | 10/1998 | Harrison et al. | 367/144 |
| 6,186,228 B1 | 2/2001 | Wegener et al. | 166/249 |

(Continued)

OTHER PUBLICATIONS

Patent Application entitled "Acoustic Stimulation Tool with Axial Driver Actuating Moment Arms on Tines" by James R. Birchak et al., filed Feb. 16, 2005 as U.S. Appl. No. 11/059,215.

(Continued)

*Primary Examiner*—Lincoln Donovan
*Assistant Examiner*—Jeremy Luks
(74) *Attorney, Agent, or Firm*—John W. Wustenberg; Baker Botts, L.L.P.

(57) ABSTRACT

An apparatus for generating acoustic waves, the apparatus having: a support structure; two tines extending from the support structure so that proximal ends of the two tines are attached to the support structure so that distal ends of the two tines are positioned with standoffs relative to a dimension of the support structure and the distal ends of the two tines are uninhibited, wherein the two tines each comprise a moment arm; and an oscillator in mechanical communication with the two tines.

19 Claims, 13 Drawing Sheets

U.S. PATENT DOCUMENTS

| | | | |
|---|---|---|---|
| 6,227,293 B1 | 5/2001 | Huffman et al. | 166/248 |
| 6,230,799 B1 | 5/2001 | Slaughter et al. | 166/249 |
| 6,241,019 B1 | 6/2001 | Davidson et al. | 166/249 |
| 6,250,386 B1 | 6/2001 | Ellingsen | 166/249 |
| 6,390,191 B1 | 5/2002 | Melson et al. | 166/177 |
| 6,405,796 B1 | 6/2002 | Meyer et al. | 166/249 |
| 6,405,797 B2 | 6/2002 | Davidson et al. | 166/249 |
| 6,412,354 B1 | 7/2002 | Birhcak et al. | 73/861.356 |
| 6,427,774 B2 | 8/2002 | Thomas et al. | 166/248 |
| 6,460,618 B1 | 10/2002 | Braithwaite et al. | 166/249 |
| 6,467,542 B1 | 10/2002 | Kostrov et al. | 166/249 |
| 6,543,281 B2 * | 4/2003 | Pelletier et al. | 73/152.47 |
| 6,554,064 B1 | 4/2003 | Restarick et al. | 166/250.01 |
| 6,557,634 B2 | 5/2003 | Hailey, Jr. et al. | 166/278 |
| 6,619,394 B2 | 9/2003 | Soliman et al. | 166/249 |
| 6,691,778 B2 | 2/2004 | Cole et al. | 166/249 |
| 6,715,541 B2 * | 4/2004 | Pedersen et al. | 166/75.15 |
| 6,725,923 B1 | 4/2004 | Ivannikov et al. | 166/249 |
| 2005/0016285 A1 * | 1/2005 | Eizenhofer | 73/714 |
| 2005/0098319 A1 * | 5/2005 | Lehman et al. | 166/304 |
| 2005/0284625 A1 * | 12/2005 | Rodney et al. | 166/250.01 |

OTHER PUBLICATIONS

SPE 86492 Paper Entitled "Radial Near Wellbore Stimulation by Acoustic Waves" by Fred van der Bas et al, 2004.

SPE 84118 Paper Entitled "High Power/High Frequency Acoustic Stimulation—A Novel and Effective Wellbore Stimulation Technology" by Sau-Wai Wong et al, 2003.

SPE 82198 Paper Entiteld "Near Wellbore Stimulation by Acoustic Waves" by Sau-Wai Wong et al, 2003.

Paper Entitled "Ulstrsonic Removal of Organic Deposits and Polymer-Induced Formation Damage" by P.M. Roberts et al, 2000.

SPE 27388 Paper Entitled "Ultrasonic Removal of Near-Wellbore Damage Caused by Fines Andmud Solids" by Adinathan Venkitaraman et al, 1994.

SPE 82197 Paper Entitled "The Application of High Power Sound Waves for Wellbore Cleaning" by Brain Champion et al, 2003.

Paper Entitled "Field Testing Consideration for Ultrasonic Cleaning Tool" Printed From the Internet, 2003.

Paper Entitled "The Tool" Printed From the Internet, 2003.

Paper Entitled "Ultrasonic Reduction of Wellbore Deposits and Formation Damage" Printed From the Internet, 2003.

Patent Application Entitled "Vibrating System and Method for use in Sand Control and Formation Stimulation in Oil and Gas Recovery Operations" by Lyle V. Lehman et al. U.S. Appl. No. 10/650,186, filed Aug. 28, 2003.

Patent Application Entitled "System and Method for Scale Removal in Oil and Gas Recovery Operations" by Lyle V. Lehman et al., U.S. Appl. 10/702,799, filed Nov. 6, 2003.

* cited by examiner

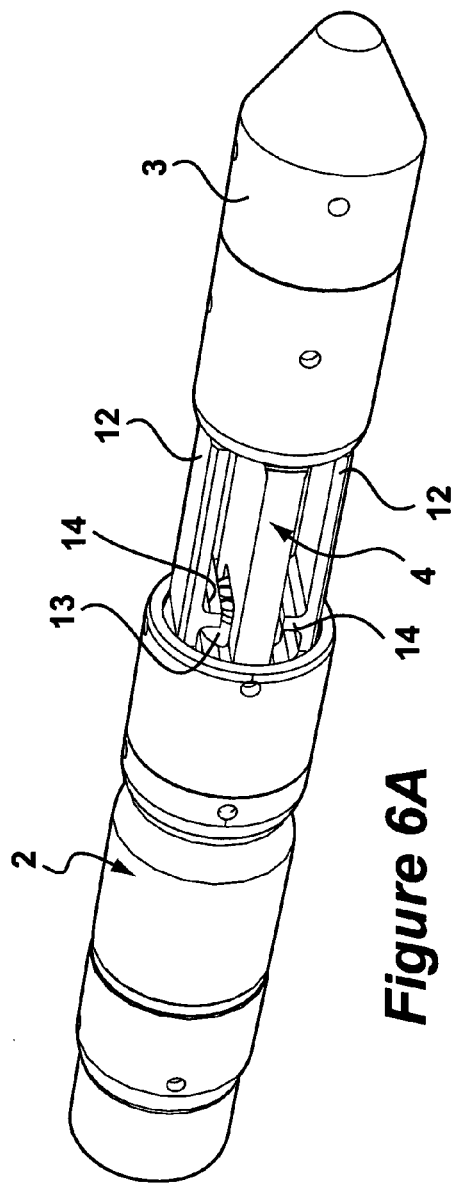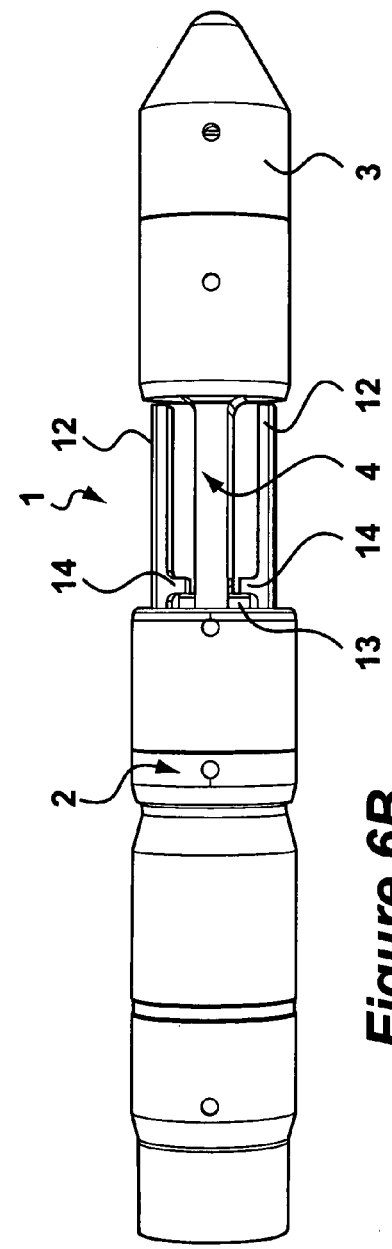
Figure 6A
Figure 6B

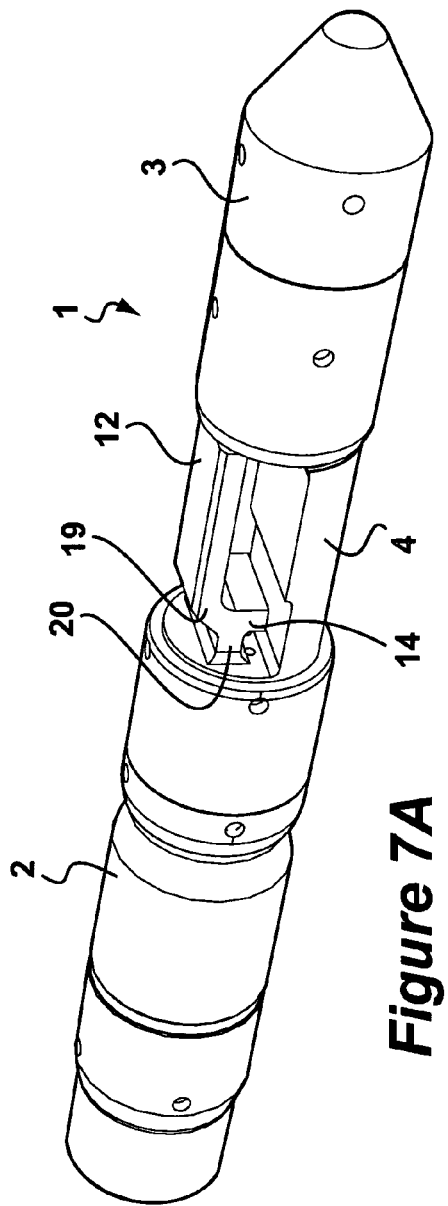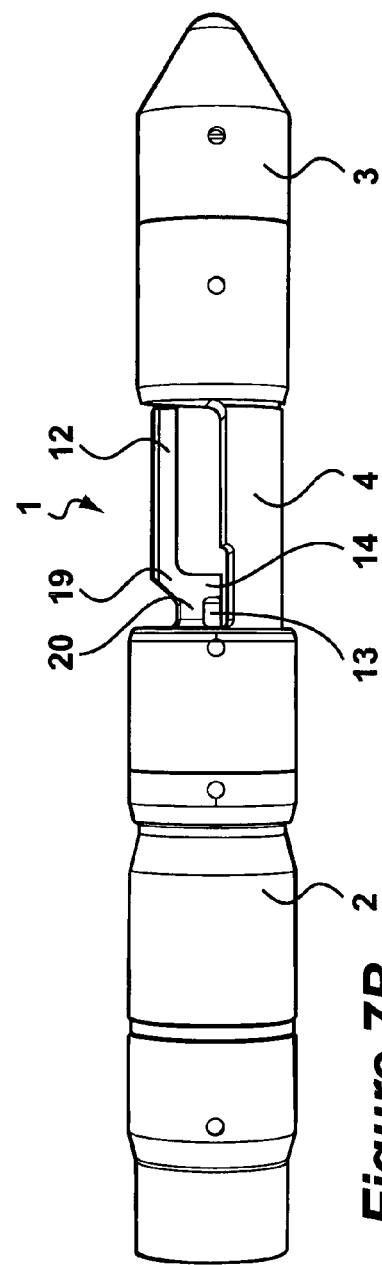
*Figure 7A*
*Figure 7B*

ACOUSTIC STIMULATION TOOL WITH AXIAL DRIVER ACTUATING MOMENT ARMS ON TINES

BACKGROUND

This invention relates to cleaning of screens, gravel packs and formations in producing well having installed production tubing. In particular, this invention relates to methods and apparatuses that provide downhole acoustic cleaning.

In any typical hydrocarbon well, damage to the surrounding formation can impede fluid flow and cause production levels to drop. While many damage mechanisms plague wells, one of the most pervasive problems is particles clogging the formation pores that usually allow hydrocarbon flow. These clogging particles can also obstruct fluid pathways in screens; preslotted, predrilled, or cemented and perforated liners; and gravel packs that may line a well. Clogging particles may even restrict fluid flow in open-hole wells. Drilling mud, drilled solid invasion, or even the porous formation medium itself may be sources for these particles. In particular, in situ fines mobilized during production can lodge themselves in the formation pores, preslotted liners, screens and gravel packs, sealing them to fluid flow. Referred to as the "skin effect," this damage is often unavoidable and can arise at any stage in the life of a typical hydrocarbon well. The hydrocarbon production industry has thus developed well-stimulation techniques to repair affected wells or at least mitigate skin-effect damage.

The two classic stimulation techniques for formation damage, matrix acidizing and hydraulic fracturing, suffer from limitations that often make them impractical. Both techniques require the operator to pump customized fluids into the well, a process that is expensive, invasive and difficult to control. In matrix acidizing, pumps inject thousands of gallons of acid into the well to dissolve away precipitates, fines, or scale on the inside of tubulars, in the pores of a screen or gravel pack, or inside the formation. Any tool, screen, liner or casing that comes into contact with the acid must be protected from its corrosive effects. A corrosion inhibitor must be used to prevent tubulars from corrosion. Also, the acid must be removed from the well. Often, the well must also be flushed with pre- and post-acid solutions. Aside from the difficulties of determining the proper chemical composition for these fluids and pumping them down the well, the environmental costs of matrix acidizing can render the process undesirable. Screens, preslotted liners and gravel packs may also be flushed with a brine solution to remove solid particles. While this brine treatment is cheap and relatively easy to complete, it offers only a temporary and localized respite from the skin effect. Moreover, frequent flushing can damage the formation and further decrease production. In hydraulic fracturing, a customized fluid is ejected at extremely high pressure against the well bore walls to force the surrounding formation to fracture. The customized gel-based fluid contains a proppant to hold the fractures open to fluid flow. While this procedure is highly effective at overcoming near-borehole skin effects, it requires both specialized equipment and specialized fluids and therefore can be costly. Fracturing can also result in particle deposition in the formation because the gels involved may leave residue in the vicinity of the fractures.

The hydrocarbon production industry developed acoustic stimulation as an alternative to the classic stimulation techniques. In acoustic stimulation used for near-well bore cleaning, high-intensity acoustic waves transfer vibrational energy to the solid particles clogging formation pores. The ensuing vibrations of the solid particles loosen them from the pores. Production-fluid flow out of the formation in producing wells causes the solid particles to migrate out of the pores, clearing the way for greater production-fluid flow. In injection wells, either injection-fluid flow or production-fluid flow can flush the loosened solid particles from the pores. Acoustic stimulation may also be used to clean preslotted and predrilled liners, screens and gravel packs. Near-well bore cleaning by acoustic stimulation has shown great promise in laboratory experiments, and the industry has developed several tools using this technique for use in real-world wells.

One type of acoustic tool that has been described employs an oval configuration. In an oval configuration, the tool has a cylindrical housing with a set of piezoelectric drivers mounted a various locations around the side walls of the housing. Separate control signals are used to activate the individual piezoelectric drivers according to a desired mode of operation. According to one exemplary oval mode configuration, four divers are position equidistant around the circumference of the housing. A four divers make up two sets with two drivers in each set. In each set of drivers, the drivers are positioned exactly opposite from each other on the housing. During operation, a first set of drivers is activated to pull outwardly on the sidewall of the housing, while the second set of drivers is activated to push inwardly on the housing. According to separate control signals, the drivers are then activated to push/pull in the opposite directions. In particular, the first set of drivers is activated to push inwardly on the sidewall of the housing, while the second set of drivers is activated to pull outwardly on the housing. As the piezoelectric drivers vibrate, the housing flexes between an oval having its major axis along the first set of drivers and an oval having its major axis along the second set of drivers. The radiated energy is strongest at the antinodes (the wall locations intersected by the diameters having maximum deflection. Midway between the antinodes on the wall are locations that remain stationary during vibration. The stationary points are nodes. Depending on the wall thickness and the material properties of the housing and the size of the piezoelectric drivers, the drivers may be activated at a frequency equal to a harmonic frequency of the housing so that the amplitude of deflection is maximized.

The lowest frequency oval mode has four antinodes and four nodes. Higher-order oval modes have even integer numbers of antinodes and nodes (six, eight, etc.). While it is theoretically possible to operate a tool with any order of oval mode resonance by driving the tool at the resonant frequency of that order of mode, practical limits on electrical impedance matching and driver placement constrain the number of useful driving frequencies.

SUMMARY

This invention relates to cleaning of screens, gravel packs and formations in producing well having installed production tubing. In particular, this invention relates to methods and apparatuses that provide downhole acoustic cleaning.

The invention provides a method for generating acoustic waves, the method having the following steps: extending a tine from a support structure so that a proximal end of the tine is attached to the support structure and a distal end of the tine is uninhibited; positioning an oscillator so as to be supported by the support structure and to mechanically communicate with the tine; and oscillating the tine with the oscillator.

According to a further aspect of the invention, there is provided a method for generating acoustic waves, the method having: extending two tines from a support structure so that proximal ends of the two tines are attached to the support structure and distal ends of the two tines are uninhibited; positioning an oscillator so as to be supported by the support structure and to mechanically communicate with the two tines; and oscillating the two tines with the oscillator.

The invention also provides a system for generating acoustic waves, the system having the following components: a support structure; a tine extending from the support structure so that a proximal end of the tine is attached to the support structure and a distal end of the tine is uninhibited; and an oscillator in mechanical communication with the tine.

According to another aspect of the invention, there is provided A system for generating acoustic waves, the system having: a support structure; two tines extending from the support structure so that proximal ends of the two tines are attached to the support structure so that distal ends of the two tines are positioned with standoffs relative to a dimension of the support structure and the distal ends of the two tines are uninhibited, wherein the two tines each comprise a moment arm; and an oscillator in mechanical communication with the two tines.

According to yet another aspect of the invention, there is provided a system for generating acoustic waves, the system having: a support structure; a tine extending from the support structure so that a proximal end of the tine is attached to the support structure and a distal end of the tine is uninhibited; and a means for oscillating the tine in a mode selected from first order, second order, and third order modes of oscillation, wherein the means for oscillating is in mechanical communication with the tine.

The objects, features, and advantages of the present invention will be readily apparent to those skilled in the art upon a reading of the description of the exemplary embodiments which follows.

BRIEF DESCRIPTION OF THE FIGURES

The present invention may be better understood by reading the following description of non-limitative embodiments with reference to the attached drawings wherein like parts of each of the several figures are identified by the same referenced characters, and which are briefly described as follows.

FIG. 6A illustrates a perspective view of an exemplary acoustic stimulation tool embodiment of the present invention having dual tines.

FIG. 6B is a side view of the embodiment of FIG. 6A.

FIG. 7A illustrates a perspective view of an exemplary acoustic stimulation tool embodiment of the present invention having a single tine.

FIG. 7B is a side view of the embodiment of FIG. 7A.

It is to be noted, however, that the appended drawings illustrated only typical embodiments of this invention and are therefore not to be considered limiting of its scope, as the invention may admit to other equally effective embodiments.

DETAILED DESCRIPTION

This invention relates to cleaning of screens, gravel packs and formations in producing well having installed production tubing. In particular, this invention relates to methods and apparatuses that provide downhole acoustic cleaning.

Figure 1:
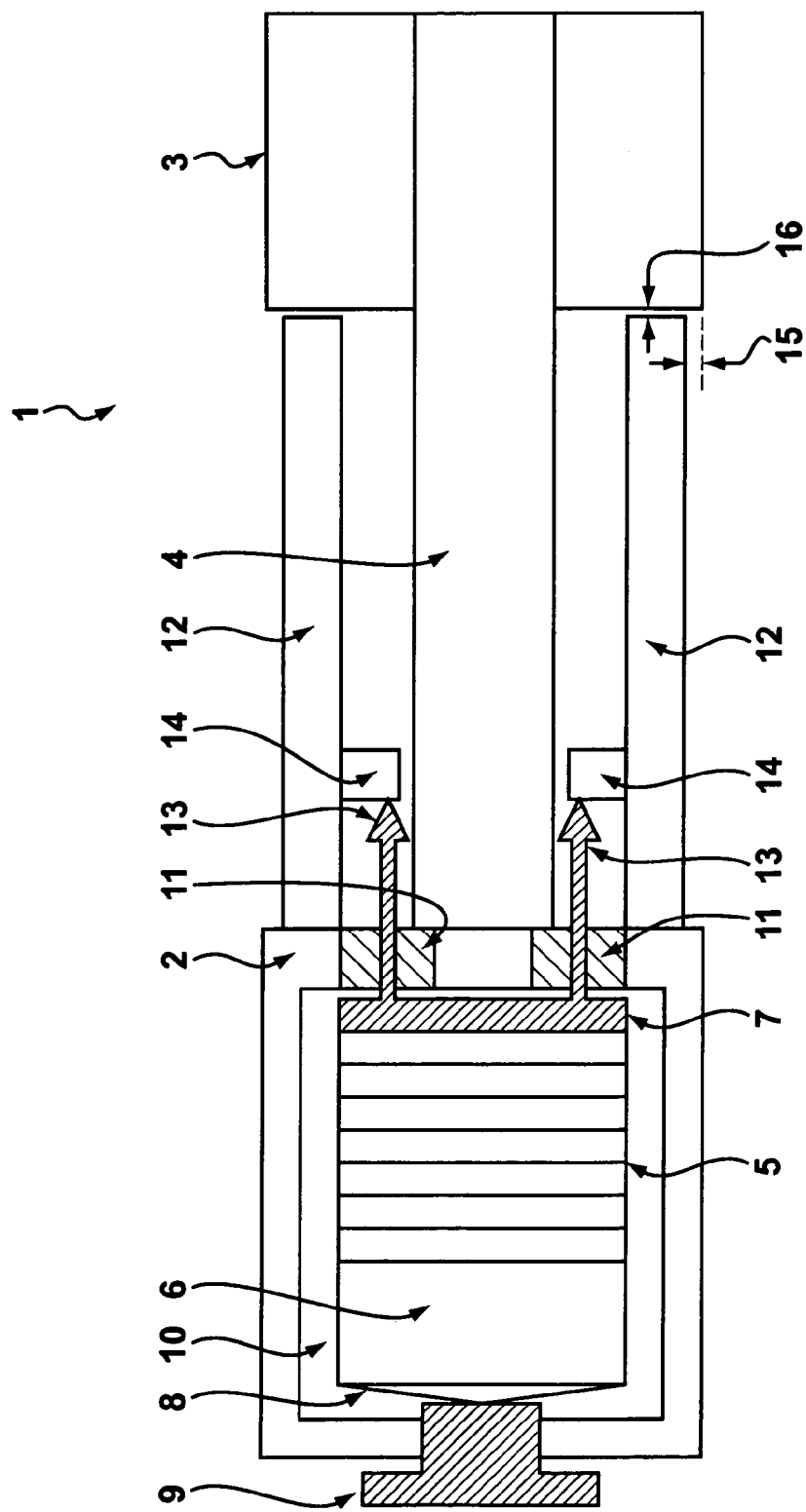
FIG. 1 is a cross-sectional, side view of an exemplary acoustic stimulation tool embodiment having dual tines driven by dual force rods.

Referring to FIG. 1, a cross-sectional side view of a embodiment of an acoustic stimulation tool is illustrated. The acoustic stimulation tool 1 has an activator housing 2 at one end and a tool body 3 at the other end. The activator housing 2 and tool body 3 are connected by a shaft 4.

The activator housing 2 contains a piezoelectric stack 5 and a temperature compensated backing mass 6. In alternative embodiments, magnetostrictive devices are used to stimulate the tool. The piezoelectric stack 5 and backing mass 6 are sandwiched between a force plate 7 and a Bellville washer 8. A preloaded bolt 9 extends through the Bellville washer 8, the backing mass 6, the piezoelectric stack 5, and into the force plate 7. In the embodiment illustrated, the preloaded bolt 9 also extends through a hole in the side of the activator housing 2. The interior of the activator housing 2 is also filled with a pressure balanced fluid 10. The activator housing 2 also has two seals 11 to retain the pressure balanced fluid 10, wherein the seals 11 are near the position where the activator housing 2 is connected to the shaft 4. Tuning fork tines 12 are also attached to the activator housing 2 near the seals 11. In the illustrated embodiment, the acoustic stimulation tool 1 has two tuning fork tines 12. The tuning fork tines 12 and seals 11 are positioned on opposite sides of the shaft 4. Two force rods 13 extend from the force plate 7 and through the seals 11. The force rods 13 engage moment arms 14, which extend from the tuning fork tines 12 towards the shaft 4. The tuning fork tines 12 are mounted to the activator housing 2 like cantilever beams so that the distal ends of the tuning fork tines 12 are free to deflect or move.

The outside diameter of the activator housing 2 is approximately equal to the outside diameter of the tool body 3. The tuning fork tines 12 are attached to the activator housing 2 at a position radially inward from the outside diameter of the activator housing 2. In embodiments of the invention where the tuning fork tines 12 are parallel to the longitudinal central axis of the acoustic stimulation tool 1, the position of the attachment of the tuning fork tines 12 relative to the activator housing 2 provides a tool wall standoff 15. The tool wall standoff provides room for the tuning fork tines 12 to vibrate when the acoustic stimulation tool 1 is pressed firmly against the inside diameter of a production tubing or other surface, not shown. In one embodiment of the invention, the outside diameters of the activator housing 2 and the tool body 3 is about 2.5 inches and the tool wall standoff 15 is about 0.2 inches. The tuning fork tines 12 extend from the activator housing 2 toward the tool body 3 but may stop short of contact therewith. In certain embodiments, a tool body standoff 16 exists between the distal ends of the tuning fork tines 12 and the tool body 3. In one embodiment of the invention, the tool body standoff 16 is 0.05 inches.

The acoustic stimulation tool 1 is operated by applying power and/or a control signal to the piezoelectric stack 5. The piezoelectric stack 5 expands and contracts according to the period of the control signal. The periodic movement of the piezoelectric stack 5 applies a periodic force to the force rods, which in turn apply a periodic force to the moment arms of the tines 12. The tines 12 are thereby excited and vibrate periodically to acoustically radiate a pressure wave pattern from the tool to the surroundings.

Figure 2:
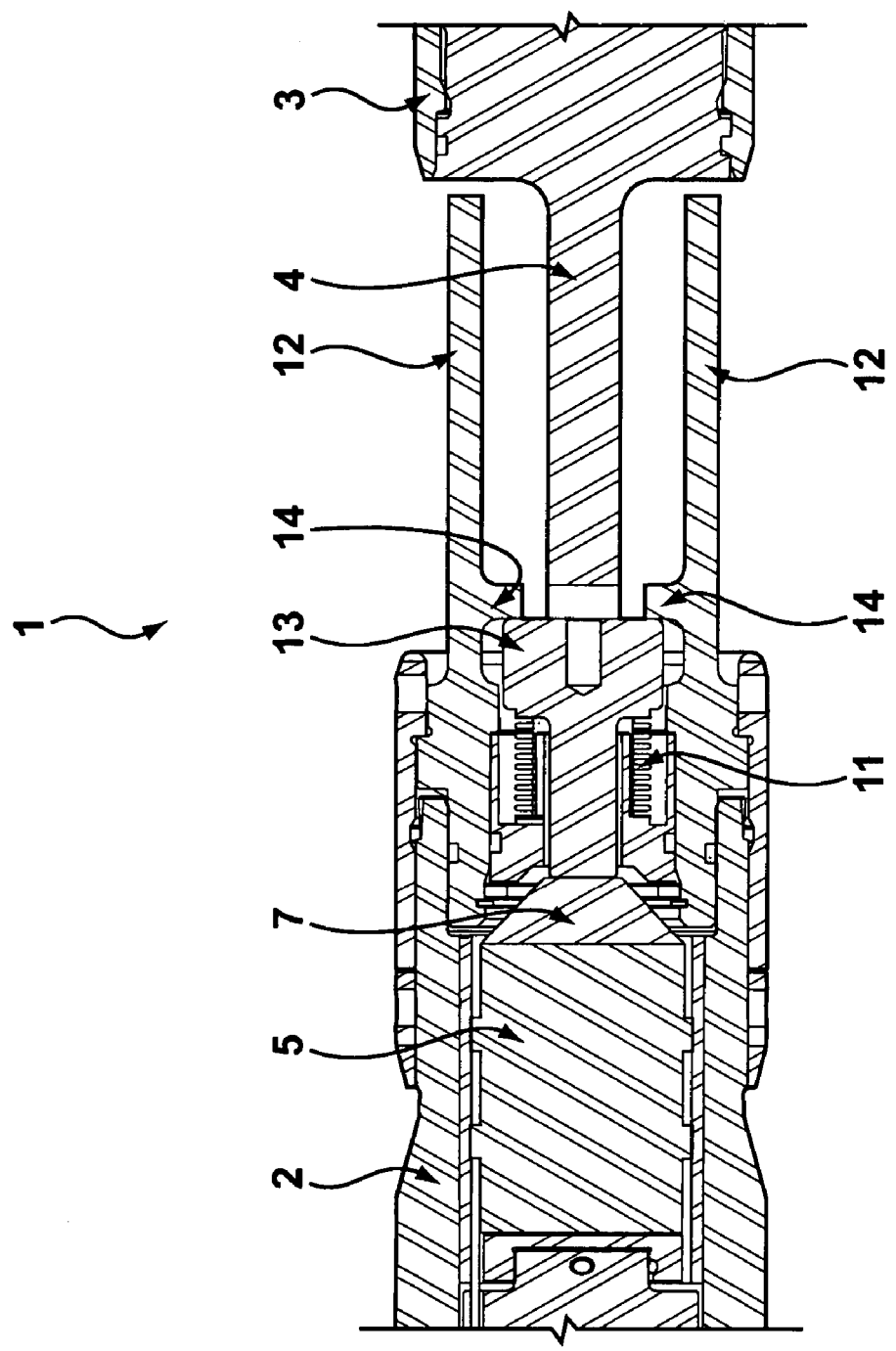
FIG. 2 is a cross-sectional, side view of an exemplary acoustic stimulation tool embodiment having a plurality of tuning fork tines driven by a single force rod.

Referring to FIG. 2, a cross-sectional side view of another embodiment of the invention is illustrated. This embodiment of the invention uses dual tuning fork tines 12 driven by a single force rod 13. The acoustic stimulation tool 1 has only one seal 11. As illustrated in FIG. 2, the acoustic stimulation tool 1 has an activator housing 2 that contains a piezoelectric stack 5. In alternative embodiments of the invention, magnetostrictive devices are used. The piezoelectric stack 5 communicates with the force rod 13 through a force plate 7. The force rod 13 extends through the seal 11. As before, the dual tuning fork tines 12 have moment arms 14, which extend radially inward from the tuning fork tines 12. The force rod 13 engages the moment arms 14 so as to transfer energy from the piezoelectric stack 5 into the tuning fork tines 12. This acoustic stimulation tool 1 also has a tool body 3 connected to the activator housing 2 by a shaft 4.

Figure 3:
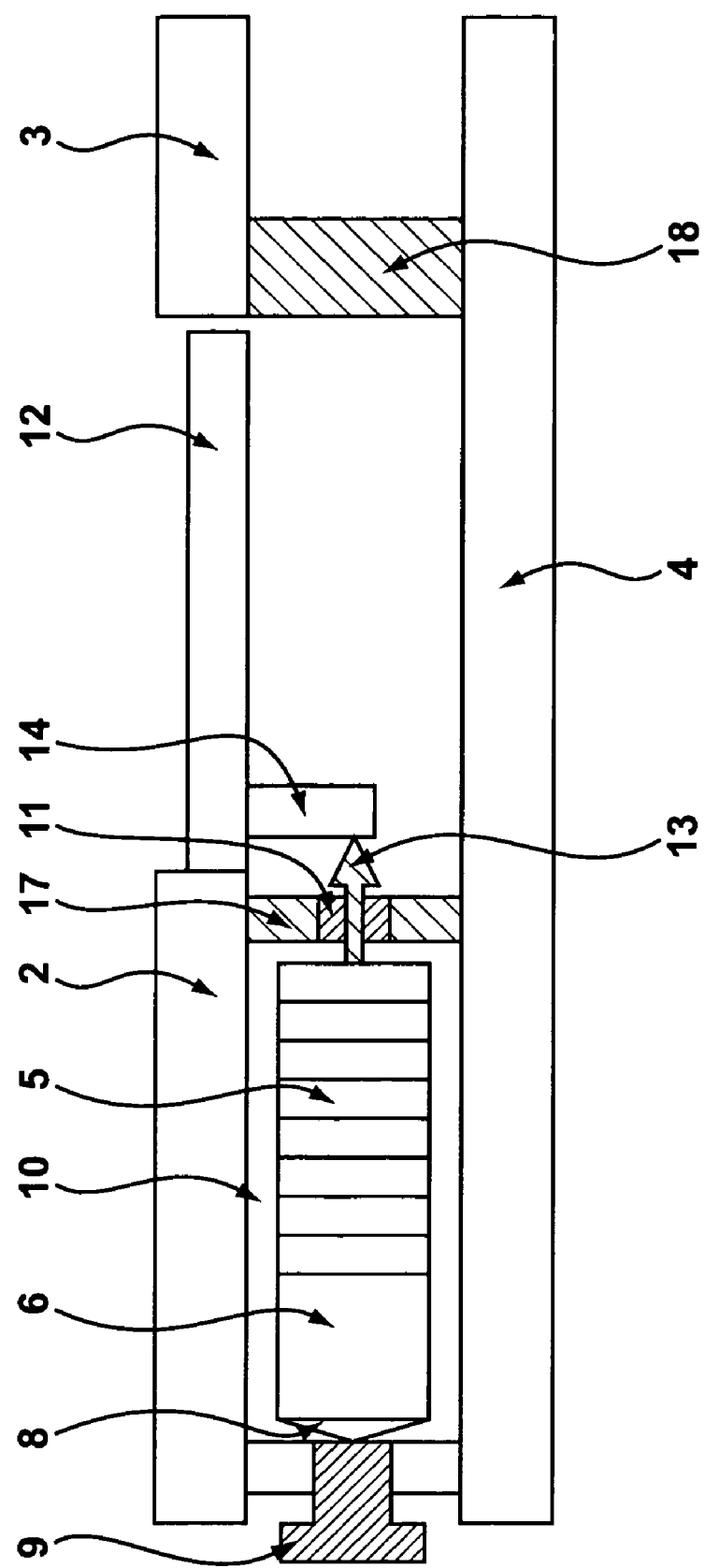
FIG. 3 is a cross-sectional, side view of an illustrative embodiment of an acoustic stimulation tool having a single tine driven by a single force rod.

FIG. 3 illustrates a cross-sectional side view of a further embodiment of an acoustic stimulation tool. In this embodiment, the cantilever design uses only a single tuning fork tine 12. The tine 12 is driven by a force rod 13 that is centered over the piezoelectric stack 5. In alternative embodiments of the invention, magnetostrictive devices are used. The deflection amplification relative to the piezoelectric deflection is relative to the ratio of the length of the tine 12 to the length of the moment arm 14. In particular, this embodiment has an activator housing 2 connected to a tool body 3 by a shaft 4. The activator housing 2 contains a piezoelectric stack 5, a backing mass 6, and a Bellville washer 8. A preloaded bolt 9 extends through the back of the activator housing 2 to support the components within the activator housing 2. A pressure-balance fluid 10 fills the remainder of the space within the activator housing 2. A single force rod 13 extends from the piezoelectric stack 5 through a seal 11. The seal 11 is supported by a seal holder 17, wherein the seal holder 17 and seal 11 retain the pressure-balance fluid 10 within the activator housing 2. A single tuning fork tine 12 extends from the activator housing 2 in a direction parallel to the longitudinal axis of the acoustic stimulation tool 1. The tuning fork tine 12 has a moment arm 14 that extends radially inward from the tuning fork tine 12. The force rod 13 extends from the piezoelectric stack 5 through the seal 11 to engage the moment arm 14. A plug 18 extends between the shaft 4 and the tool body 3. In this embodiment, the shaft 4 extends the entire length of the acoustic stimulation tool so as to comprise a portion of the activator housing 2 and a portion of the tool body 3.

Figure 4:
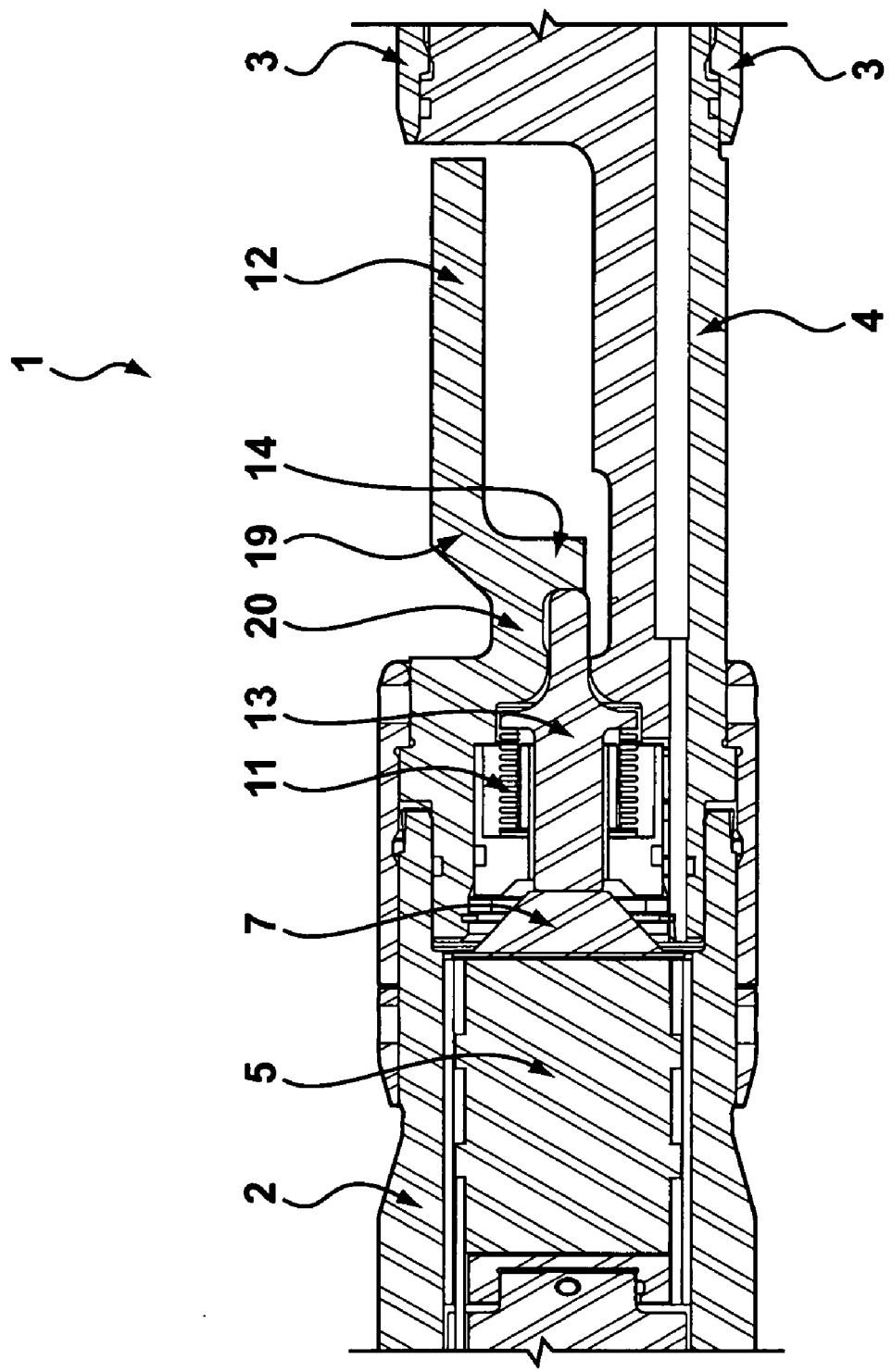
FIG. 4 is a cross-sectional, side view of an exemplary embodiment of an acoustic stimulation tool having a single tine and a single force rod wherein a piezoelectric stack is centralized in the tool and the tine is attached to a beam and post.

FIG. 4 illustrates a cross-sectional, side view of another embodiment of an acoustic stimulation tool. In particular, the acoustic stimulation tool 1 has an activator housing 2 and a tool body 3, wherein the tool body 3 is connected to the housing 2 via a shaft 4. A piezoelectric stack 5 resides within the housing 2 so as to mechanically communicate with a single force rod 13 through a force plate 7. In alternative embodiments of the invention, magnetostrictive devices are used. The force rod 13 extends through a seal 11. The acoustic stimulation tool 1 also has a tuning fork tine 12 that is connected to a beam 19. The beam 19 is connected to a pivot post 20. A moment arm 14 is also connected to the pivot post 20, so that the moment arm 14 and beam 19 extend in opposite directions from the pivot post 20. The moment arm 14 extends radially inward while the beam 19 extends radially outward. The tuning fork tine 12 extends from the beam 19 in a direction parallel to the longitudinal axis of the acoustic stimulation tool 1. In this embodiment, to maintain a large deflection amplitude with a relatively large distance between the force rod 13 and the tine 12, a beam and pivot arm approach is used. Forces are centered on the axis of the piezoelectric stack 5 to reduce edge stress concentrations. The rocking of the beam 19 on the pivot post 20 provides a radial displacement of the tip of the tine 12 without increasing the effect or length of the moment arm 14.

Figure 5:
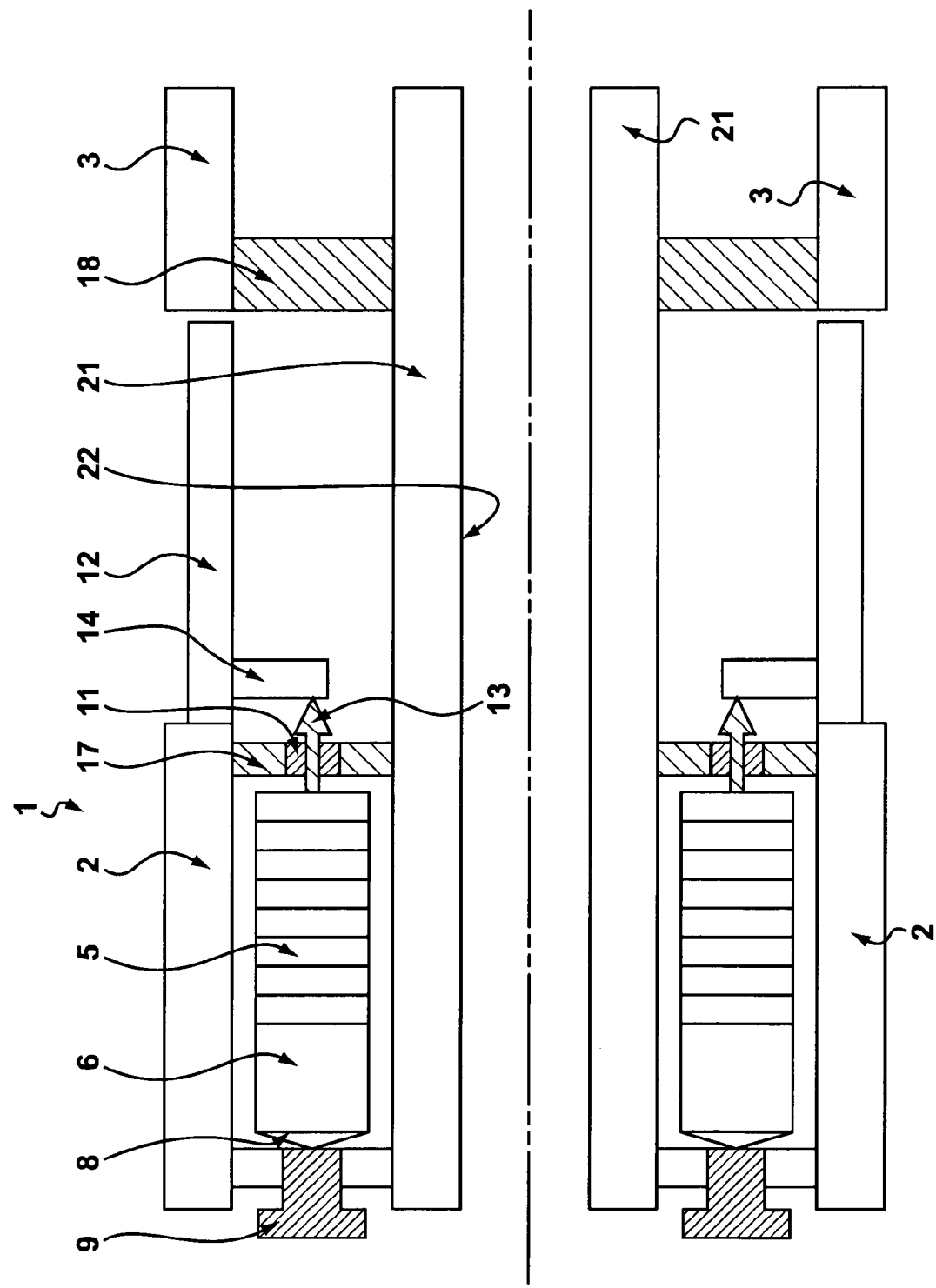
FIG. 5 is a cross-sectional, side view of an illustrative acoustic stimulation tool embodiment having a plurality of tines positioned concentrically about a flow pipe.

A further embodiment of the invention is illustrated with reference to FIG. 5. FIG. 5 illustrates a configuration for a ring of tines 12 surrounding a passage or bore 22 for fluid. In certain embodiments, a pipe forming the passage 22 of the fluid is strong enough to support the portions of the tool axially down-hole from the ring of cantilever bars or tines 12. The acoustic stimulation tool 1 comprises a pipe 21 having an internal bore 22 through which fluid is transmitted. A cylindrical activator housing 2 is positioned concentrically about the pipe 21. An annular piezoelectric stack 5 is positioned in an annulus defined between the pipe 21 and the activator housing 2. In alternative embodiments of the invention, magnetostrictive devices are used. An annular backing mass 6 and an annular Bellville washer 8 are also positioned within the activator housing 2. A plurality of preloaded bolts 9 extend through the back of the activator housing 2 to support the Bellville washer 8, the backing mass 6, and the piezoelectric stack 5. A plurality of force rods 13 extend through a plurality of seals 11 from the piezoelectric stack 5. The seals 11 are supported by an annular seal holder 17 that extends radially outward from the pipe 21 to the activator housing 2. A plurality of tuning fork tines 12 extend from the activator housing 2 in a direction parallel to the longitudinal axis of the pipe 21. Moment arms 14 extend radially inward from each of the tuning fork tines 12. The moment arms 14 are engaged by the force rods 13. The acoustic stimulation tool 1 also has a tool body 3 that is supported by a plug 18, wherein the plug extends between the pipe 21 and the tool body 3.

In certain alternative embodiments, one of the tines illustrated in FIG. 5 may be mounted on a pad for strip cleaning.

During cleaning, the tool is actuated to move the pad close to the wall of the well bore. In the pad, a piezoelectric cylindrical stack drives the force rod and tine. The pad configuration concentrates the energy for strip cleaning.

Figure 6C:
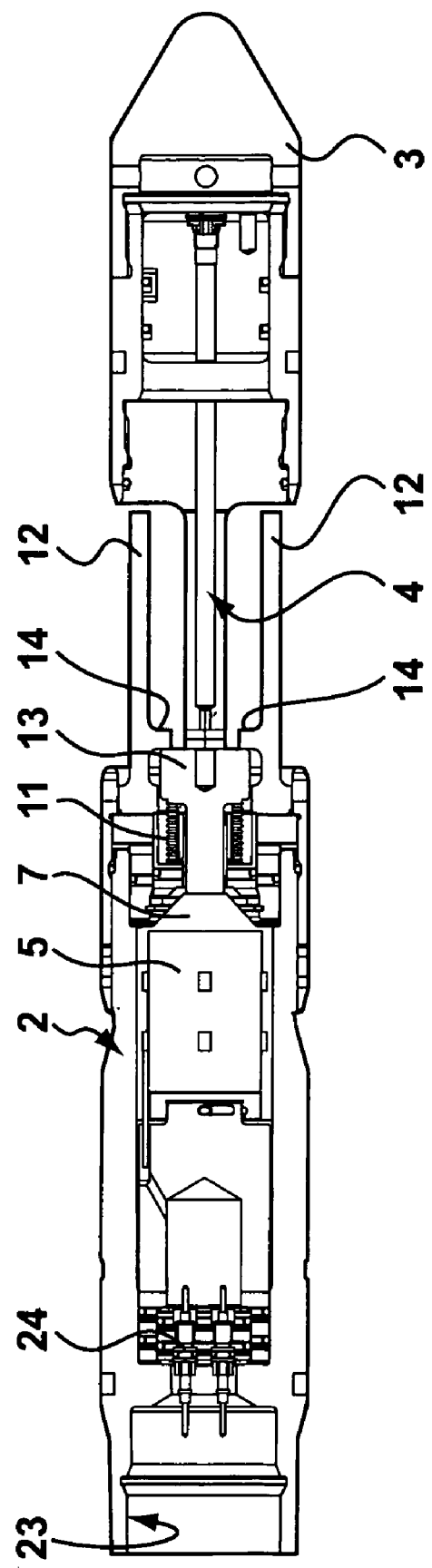
FIG. 6C is a cross-sectional, side view of the embodiment of FIGS. 6A and 6B.

A perspective view of a dual tine embodiment of the invention is shown in FIG. 6A. FIG. 6B is a side view and FIG. 6C is a cross-sectional, side view of the same embodiment. In certain embodiments, such as this one, the acoustic stimulation tool 1 has a cone-shaped tool body 3, which allows for easier insertion of the tool into a casing or open well bore. The activator housing 2 is connected to the tool body 3 by a shaft 4. The activator housing 2 also has a female coupler 23 for making-up to a work string, tubing, or wireline. The activator housing 2 has several pieces that are made-up to each other during assembly to allow the internal components to be secured therein. These components may include: power and control transmitters 24, a piezoelectric stack 5, a force plate 7, and a force rod 13. Two tines 12 extend from the activator housing 2 toward the tool body 3 on opposite sides of the shaft 4. The tines 12 are substantially parallel to the shaft 4. Each tine 12 has a moment arm 14 that extends perpendicularly from the inner surface of the tine 12 toward the shaft 4. An end of the force rod 13 is pressed firmly against the moment arms 14 of both tines 12. The shaft 4 has a cut-away portion near its attachment to the activator housing 2, to accommodate the force rod 13. The force rod 13 extends through a seal 11 in the activator housing 2.

Figure 7C:
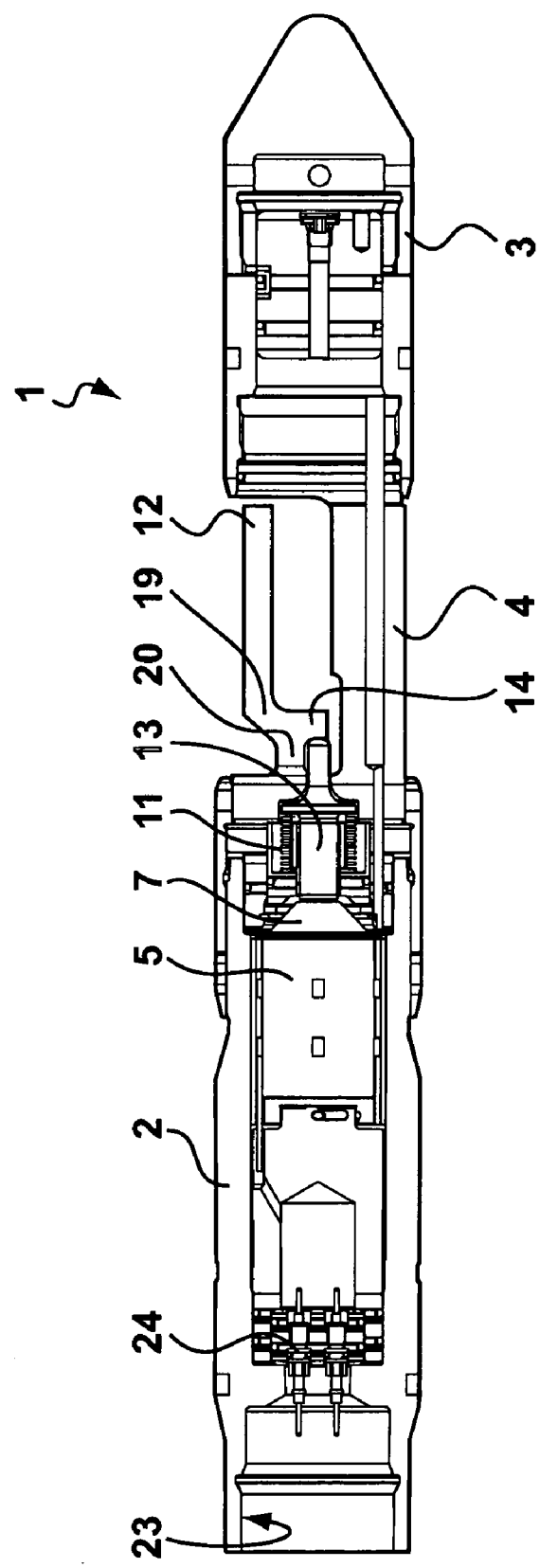
FIG. 7C is a cross-sectional, side view of the embodiment of FIGS. 7A and 7B.

A perspective view of a single tine embodiment of the invention is shown in FIG. 7A. FIG. 7B is a side view and FIG. 7C is a cross-sectional, side view of the single time embodiment of FIG. 7A. In certain single tine embodiments, such as this one, a shaft 4 connects a tool body 3 to an activator housing 2. The acoustic stimulation tool 1 has a cone-shaped tool body 3. The activator housing 2 also has a female coupler 23 that may be used to make-up the housing to a work string, tubing, or wireline. The activator housing 2 has several pieces that are made-up to each other during assembly to allow internal components to be secured therein. These components may include: power and control transmitters 24, a piezoelectric stack 5, a force plate 7, and a force rod 13. The force rod 13 extends through a seal 11 in the activator housing 2. In this embodiment of an acoustic stimulation tool 1, a single tine 12 is connected to a beam 19. The beam 19 is connected to a pivot post 20. A moment arm 14 is also connected to the pivot post 20, so that the moment arm 14 and beam 19 extend in opposite directions from the distal end of the pivot post 20. The pivot post 20 is connected at its proximal end to the activator housing 2. The moment arm 14 extends radially inward while the beam 19 extends radially outward. The tuning fork tine 12 extends from the beam 19 in a direction parallel to the shaft 4. The configuration of the beam 19 and pivot post provides for maintenance of a large deflection amplitude with a relatively large distance between the force rod 13 and the tine 12. Further, the configurations allows forces to be centered on the axis of the piezoelectric stack 5 so as to reduce edge stress concentrations. The rocking of the beam 19 on the pivot post 20 provides a radial displacement of the tip of the tine 12 without increasing the effect or length of the moment arm 14.

Figure 11:
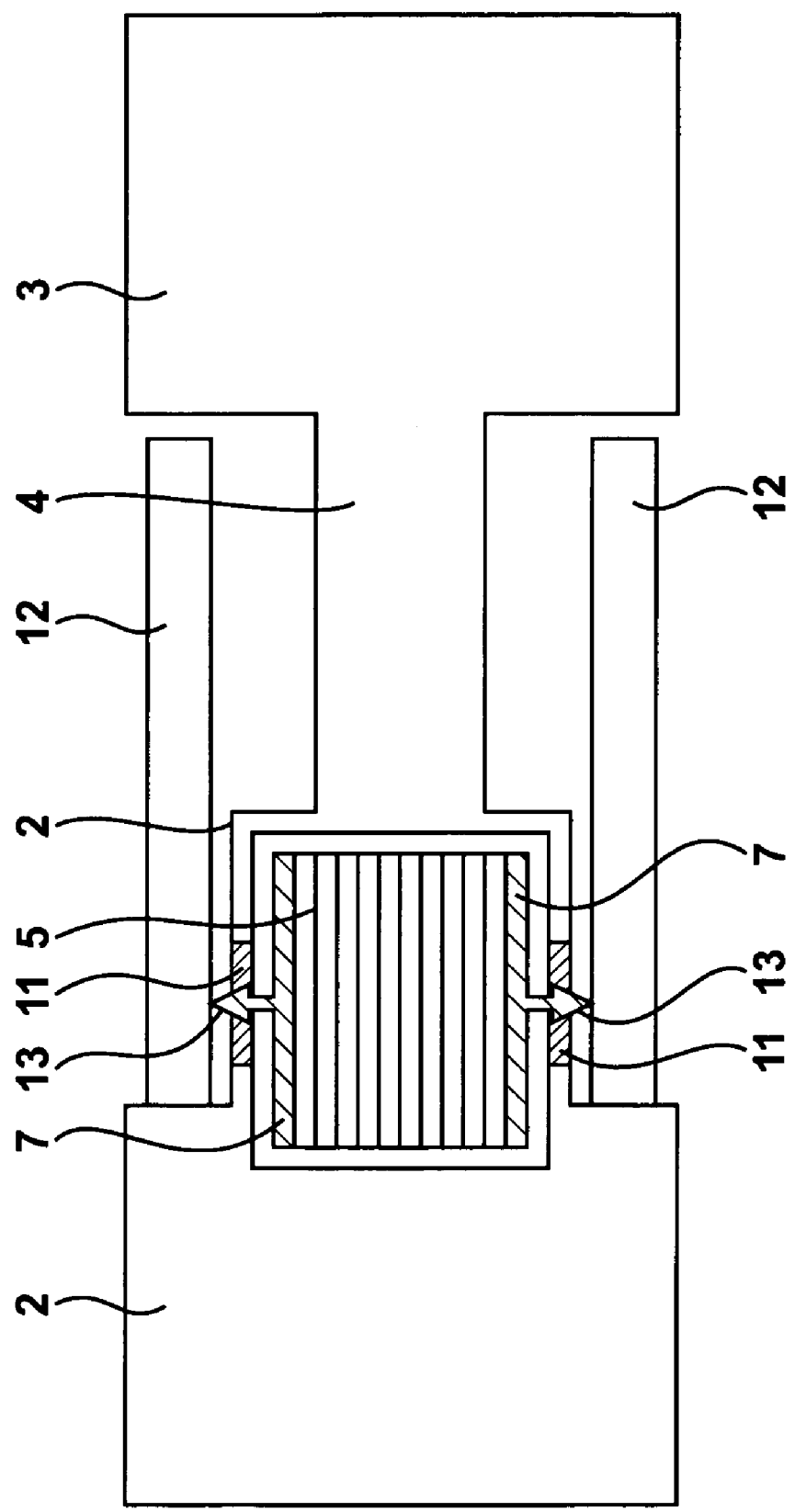
FIG. 11 is a cross-sectional, side view of an acoustic stimulation tool embodiment having dual tines and a piezoelectric oscillator positioned transverse to the tines.

Referring to FIG. 11, a cross-sectional, side view of a embodiment of an acoustic stimulation tool is illustrated. The acoustic stimulation tool 1 has an activator housing 2 at one end and a tool body 3 at the other end. The activator housing 2 and tool body 3 are connected by a shaft 4. The activator housing 2 contains a piezoelectric stack 5 sandwiched between two force plates 7. In the embodiment illustrated, piezoelectric stack 5 is positioned in a direction transverse to two tines 12. Force rods 13 extend from the force plates 7 and through seals 11 to engage the tines 12. The tuning fork tines 12 are also attached to the activator housing 2 like cantilever beams so that the distal ends of the tuning fork tines 12 are free to deflect or move.

In alternative embodiments of the invention, a single tine extends from the support housing and the piezoelectric stack is oriented transversely between the tine and a portion of the support housing. In certain embodiments of the invention, the piezoelectric stack oscillates the tines by pushing the tines transversely to cause the tine to vibrate or oscillate.

The illustrated embodiments are described herein as employing piezoelectric devices. However, in alternative embodiments of the invention, magnetostrictive devices are used.

Because the tines 12 are attached at their proximal ends to the housing and are free to move at their distal ends, the tines behave like cantilevers. The shape, size, weight, etc. of the tine define how the tine vibrates in response to forces applied to the moment arm of the tine by the force rod. This vibrational motion of the tine imparts momentum to the acoustic stimulation tool and may result in relatively small amplitude for the tine. Thus, care should be taken to ensure that the vibrational motion of the tine(s) is not dampened significantly by the other structures of the acoustic stimulation tool.

Certain dual tine configurations of the present invention have two lowest order modes of vibration. The conventional (symmetric) mode moves both tines radially outward together and radially inward together. This symmetric motion balances momentum imparted to the remaining structures of the acoustic stimulation tool and gives relatively little tool vibration. An unconventional (asymmetric) mode moves one tine inwardly while it moves the other tine outwardly and visa versa. Tine displacement for the symmetric mode has one of the tines move as the mirror image relative to the motion of the same tine in the asymmetric mode (assuming the motions for the other tines are controlled to be identical for symmetric and asymmetric modes). If one tuning fork tine moves radially outward then the other tine moves radially inward, the asymmetric mode may impart momentum to the remaining portions of the tool. Depending on the tine configuration, the asymmetric and symmetric modes may have slightly different frequencies.

Depending on the configuration of the tine, the tine may also have modes of vibration according to harmonic frequencies. The first three order modes of an exemplary tine are shown with reference to FIGS. 8 through 10.

Figure 8:
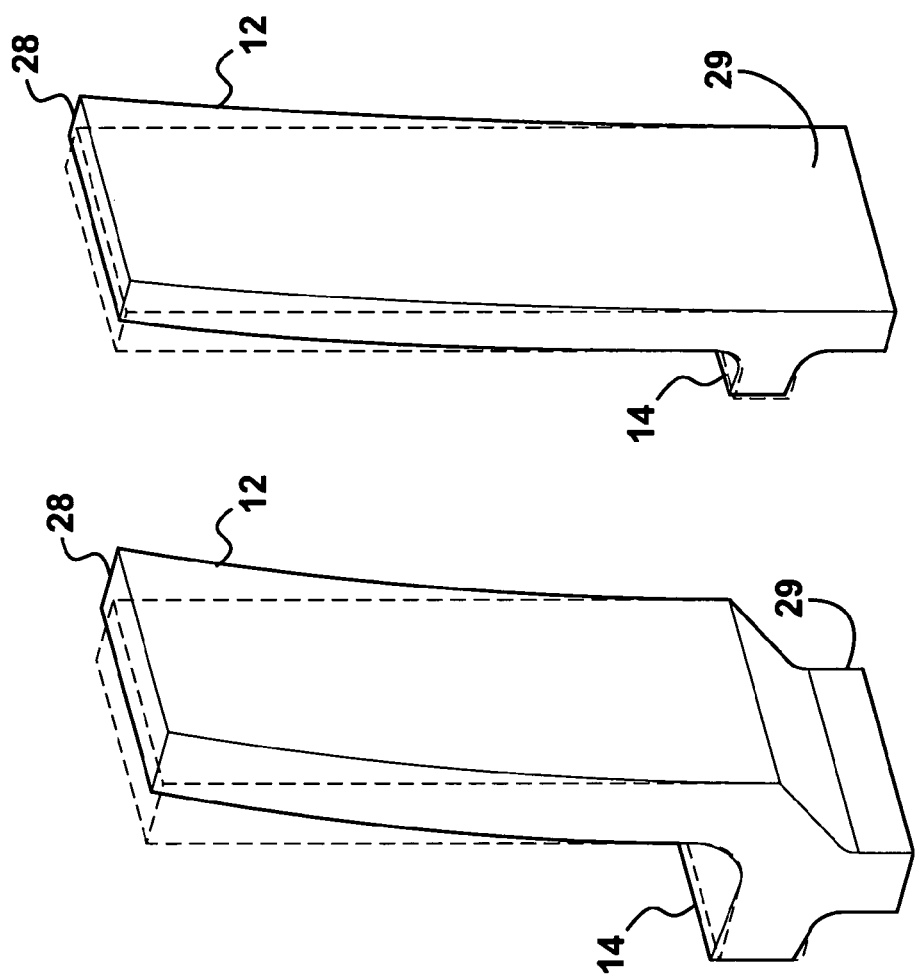
FIG. 8 shows a two different embodiments of tines driven at a frequency of fundamental mode of oscillation, wherein the tines are fixed at their lower ends and forces are applied to the moment arms.

In FIG. 8, the fundamental or first mode of oscillation has no nodes between the moment arm 14 and the distal end 28 of the tine 12. A node is portion of the tine having minimum or zero amplitude while other portions of the tine vibrate and/or oscillate periodically. The dotted line in the figure indicates the position of tine absent any vibration, i.e., the tine is stationary in this position. In this first order mode, the distal end 28 of the tine 12 simply wags back and forth from side to side passing through the center position (shown by the dotted line). Of course, the proximal end 29 remains stationary. The frequency of the force necessary to induce this mode of oscillation in the tine 12 depends on the configuration of the tine 12, but it is a relatively lower frequency compared to the other modes illustrated below. Certain dual tine embodiments of an acoustic stimulation tool can have symmetric and asymmetric first order modes of oscillation. Asymmetric first order modes of oscillation may cause tool vibrations.

Figure 9:
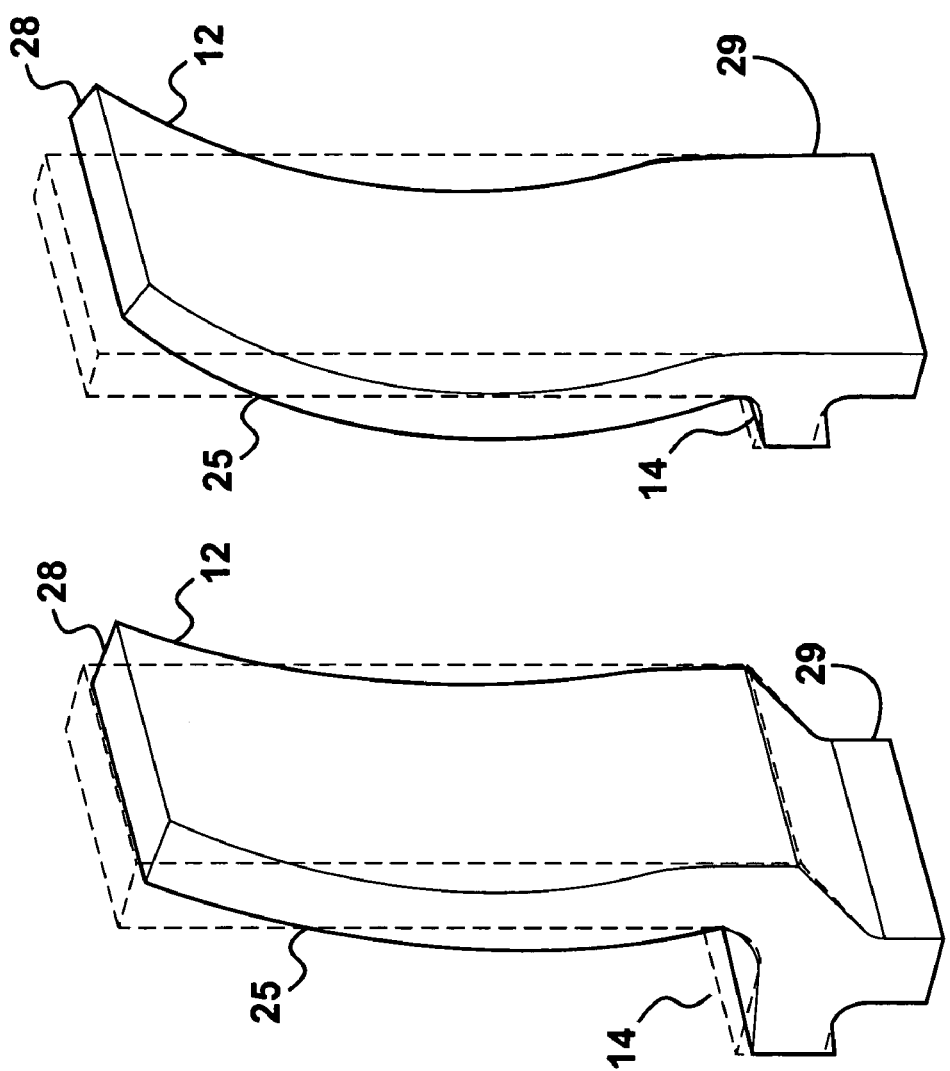
FIG. 9 illustrates perspectives views of two tine embodiments of the present invention driven at a frequency of a second order mode of oscillation, wherein the tines are fixed at their lower ends to the moment arms.

In FIG. 9, a second order mode of oscillation is illustrated for the tine of FIG. 8. This second order mode has one node 25 between the stationary, proximal end 29 and the distal end 28 of the tine 12. In certain embodiments of the tine oscillating in a second order mode, the displacements or amplitudes of tine between the node 25 and the distal end 28 approximately cancel the displacements or amplitudes of the tine between the node 25 and the proximal end 29. Thus, certain tine configurations oscillating in a second order mode may induce relatively small vibrations in the acoustic stimulation tool. The frequency of the force necessary to induce a second order mode of oscillation in the tine 12 depends on the configuration of the tine 12, but it is a relatively higher frequency compared to the mode illustrated in FIG. 8. Certain tine embodiments may have symmetric and asymmetric second order modes of oscillation, wherein the asymmetric modes may cause relatively greater acoustic stimulation tool vibrations.

Figure 10:
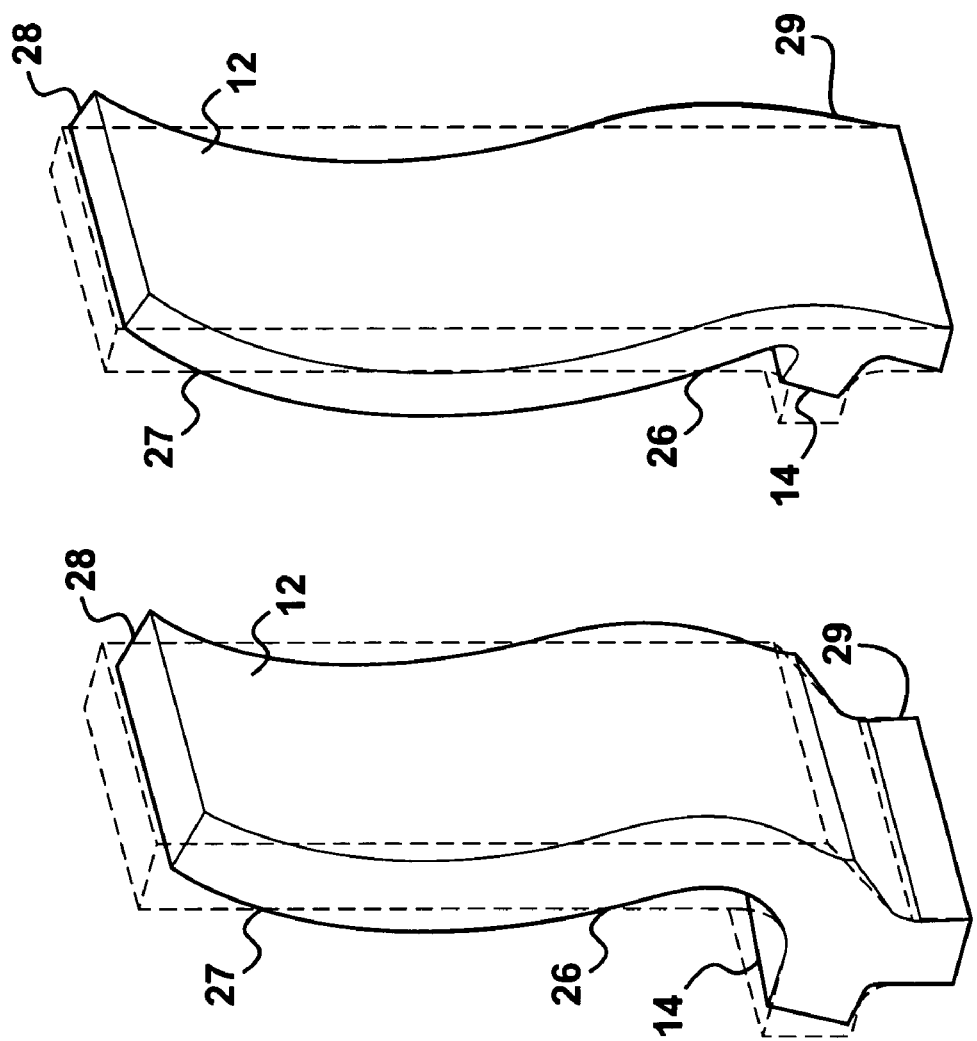
FIG. 10 shows perspective views of two tine embodiments of the present invention driven at a frequency of a third order mode of oscillation, wherein the tines are fixed at their lower ends and forces are applied to the moment arms.

A third order mode of oscillation is illustrated in FIG. 10 for the tine of FIGS. 8 and 9. The third order mode of oscillation has two nodes between the proximal end 29 and the distal end 28 of the tine 12—a first node 26 of the third order and a second node 27 of the third order. In certain embodiments of the tine oscillating in a third order mode, the displacements or amplitudes of antinodes approximately cancel each other so that relatively small vibrations are induced in the acoustic stimulation tool. The frequency of the force necessary to induce a third order mode of oscillation in the tine 12 depends on the configuration of the tine 12, but it is a relatively higher frequency compared to the first and second modes. Certain tine embodiments may have symmetric and asymmetric third order modes of oscillation, wherein the asymmetric modes may cause relatively greater acoustic stimulation tool vibrations.

Higher order modes of oscillation may also be achieved by these and other tine configurations.

The axial length of the antinodes in FIG. 10 are smaller than the antinodes in FIG. 9. In certain tine configurations, the larger the antinodes for a given frequency, the greater the depth of penetration of the acoustic intensity imputed by the acoustic stimulation tool. In certain time configurations, relatively thicker tines obtain larger antinodes for a given frequency and a given length of tine. Thicker tines may also oscillate at higher frequencies and store greater energy for a given deflection for a given length. In some embodiments of the invention, the thickness and length of the tine is selected to give an antinode length approximately equal to the width of the tine. This condition gives an acoustic aperture which is approximately square. For a square aperture, the volume of formation cleaned may be optimized because the radiation pattern has equal roll off with distance for each of the two orthogonal directions. For any other shape of aperture, the radiation pattern is broader in the plane of the narrow aperture direction than in the orthogonal plane of the wide aperture direction.

One embodiment of the invention uses axial piezoelectric stacks and moment arms to actuate the tines. The tine thickness and length are selected to obtain large axial length of antinodes, comparable to the width of the tine. The tool configuration has a maximum outside diameter that passes through any constriction in the candidate production tubing. The tine has a standoff of at least 0.2 inches from the formation wall during cleaning.

Therefore, the present invention is well adapted to carry out the objects and attain the ends and advantages mentioned as well as those that are inherent therein. While the invention has been depicted and described with reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An apparatus for generating acoustic waves, comprising:
   a support structure comprising an activator housing and a tool body connected by a shaft;
   a tine extending from the support structure so that a proximal end of the tine is attached to the support structure and a distal end of the tine is uninhibited, a pivot post extending from the support structure; and a beam extending from the pivot post, wherein the tine extends from the beam, wherein the distal end of the tine is positioned with a standoff relative to a dimension of the support structure; and
   an oscillator in mechanical communication with the tine.

2. The apparatus of claim 1 wherein the tine comprises a moment arm.

3. The apparatus of claim 1 further comprising a plurality of tines extending from the support structure so that proximal ends of the tines are attached to the support structure and distal ends of the tines are uninhibited.

4. The apparatus of claim 1 wherein the oscillator comprises a piezoelectric stack.

5. The apparatus of claim 1 wherein the oscillator comprises a magnetostrictive device.

6. The apparatus of claim 1 wherein the tine comprises a moment arm, and the apparatus further comprises a force rod positioned between the oscillator and the moment arm of the tine.

7. The apparatus of claim 1 further comprising a pipe extending through the support structure, wherein the pipe has a bore therethrough.

8. The apparatus of claim 1 wherein the oscillator is positioned with its longitudinal axis substantially parallel to the tine.

9. The apparatus of claim 1 wherein the oscillator is positioned with its longitudinal axis substantially perpendicular to the tine.

10. The apparatus of claim 1 further comprising a pipe extending through the support structure, wherein the tine and the oscillator are mounted on a pad, and the pad is extendible from the pipe.

11. A system for generating acoustic waves, comprising:
    a support structure;
    two tines extending from the support structure so that proximal ends of the two tines are attached to the support structure so that distal ends of the two tines are positioned with standoffs relative to a dimension of the support structure and the distal ends of the two tines are uninhibited, two pivot posts extending from the support structure; and a beam extending from each of the two pivot posts, wherein the two tines extend from the beams, wherein the two tines each comprise a moment arm; and an oscillator in mechanical communication with the two tines.

12. The system of claim 11 wherein the oscillator comprises:
a piezoelectric stack;
a backing mass attached to the piezoelectric stack;
a power transmitter electrically coupled to the piezoelectric stack; and
a control transmitter electrically coupled to the piezoelectric stack.

13. The system of claim 11 wherein the oscillator comprises a magnetostrictive device.

14. The system of claim 11 further comprising a force rod positioned between the oscillator and the moment arms of the two tines.

15. The system of claim 11 further comprising two force rods positioned between the oscillator and the moment arms of the two tines, wherein one of the two force rods engages one of the moment arms and the other force rod engages the other moment arm.

16. A system for generating acoustic waves, comprising:
a support structure;
a tine extending from the support structure so that a proximal end of the tine is attached to the support structure and a distal end of the tine is uninhibited; a pivot post extending from the support structure; and a beam extending from the pivot post, wherein the tine extends from the beam, and
a means for oscillating the tine in a mode selected from first order, second order, and third order modes of oscillation, wherein the means for oscillating is in mechanical communication with the tine.

17. The system of claim 16 further comprising another tine extending from the support structure so that a proximal end of the another tine is attached to the support structure and a distal end of the another tine is uninhibited, wherein the means for oscillating functions to oscillate the two tines symmetrically.

18. The system of claim 16 further comprising another tine extending from the support structure so that a proximal end of the another tine is attached to the support structure and a distal end of the another tine is uninhibited, wherein the means for oscillating functions to oscillate the two tines asymmetrically.

19. The system of claim 16 wherein the means for oscillating functions to oscillate the tine so as to radiate an acoustic pattern having substantially equal roll-off with distance for two orthogonal planes perpendicular to a face of the tine.

* * * * *